United States Patent [19]
Bishop

[11] Patent Number: 5,455,628
[45] Date of Patent: Oct. 3, 1995

[54] CONVERTER TO CONVERT A COMPUTER GRAPHICS SIGNAL TO AN INTERLACED VIDEO SIGNAL

[75] Inventor: Michael D. Bishop, Bushey, United Kingdom

[73] Assignee: VideoLogic Limited, Kings Langley, United Kingdom

[21] Appl. No.: 122,972

[22] Filed: Sep. 16, 1993

[30] Foreign Application Priority Data

Sep. 16, 1992 [GB] United Kingdom ............... 9219596

[51] Int. Cl.⁶ ................................................ H04N 7/01
[52] U.S. Cl. ........................................ 348/446; 348/455
[58] Field of Search .............................. 348/446, 441, 348/555, 453, 455, 454; 345/154; H04N 7/01

[56] References Cited

U.S. PATENT DOCUMENTS

| | | |
|---|---|---|
| 4,200,887 | 4/1980 | Van Den Avoort . |
| 4,298,888 | 11/1981 | Colles et al. .............. 348/446 |
| 4,386,367 | 5/1983 | Peterson et al. . |
| 4,694,325 | 9/1987 | Mehrgardt . |
| 4,924,315 | 5/1990 | Yamashita . |
| 5,019,904 | 5/1991 | Campbell .................. 348/446 |

*Primary Examiner*—Victor R. Kostak
*Attorney, Agent, or Firm*—Flynn, Thiel, Boutell & Tanis

[57] ABSTRACT

A converter receives a computer graphics signal from a PC and provides from it a video signal for display or recording. Analogue RGB signals are digitised and applied to a vertical filter and rate buffer. The rate buffer needs only one to three lines of storage capacity. The received graphics signal is a VGA 640×480 non-interlaced mode signal, and the rate buffer halves the line rate and produces an interlaced output. Such a signal can be treated as a video signal, after reconversion to analogue form. The vertical filter provides a degree of vertical averaging to remove flicker. In a preferred store using three line-store FIFOs, input lines are applied to them in the sequence A,B,C,B,A, and so on.

13 Claims, 5 Drawing Sheets

Fig. 6

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| (I) INPUT LINE | 1 | 2 | 3 | 4 | 5 | 6 | 7 | 8 | 9 | 10 | 11 | 12 | 13 | 14 |
| (II) STORE | A | B | C | B | A | B | C | B | A | B | C | B | A | B |
| (III) STORE A | 1 | 1 | 1 | 1 | 5 REPLACES 1 | 5 | 5 | 5 | 9 REPLACES 5 | 9 | 9 | 9 | 13 REPLACES 9 | 13 |
| (IV) STORE B | - | - | 2 | 4 REPLACES 2 | 4 | 6 REPLACES 4 | 6 | 8 REPLACES 6 | 8 | 10 REPLACES 8 | 10 | 12 REPLACES 10 | 12 | 14 REPLACES 12 |
| (V) STORE C | - | - | 3 | 3 | 3 | 3 | 7 REPLACES 3 | 7 | 7 | 7 | 11 REPLACES 7 | 11 | 11 | 11 |
| (VI) OUTPUT LINE | - | - | - | 2 | | 4 | | 6 | | 8 | | 10 | | 12 |

TIME →

CONVERTER TO CONVERT A COMPUTER GRAPHICS SIGNAL TO AN INTERLACED VIDEO SIGNAL

BACKGROUND OF THE INVENTION

The invention relates to a converter for generating a video signal from a computer graphics signal.

Television (TV) technology has evolved from the necessity of minimising the transmission bandwidth required to carry moving natural-world images. Current TV standards have comparatively low spatial resolution, a chrominance bandwidth which is much less than the luminance bandwidth, and a 2:1 field interlace.

Personal computer (PC) display technology is, like television, also based largely on CRTs (cathode ray tubes) but has different constraints and objectives. Transmission bandwidth is not relevant and the images usually contain fine detail of high contrast, such as text. Satisfactory display of high-contrast single-pixel details require much more bandwidth than is required for natural world images, and non-interlaced scanning is almost essential. (The terms "sequential" or "progressive" are sometimes used as synonyms for "non-interlaced".) The frame refresh rate has to be at least 60 Hz (often 70 to 75 Hz) to eliminate flicker effectively. The combination of medium to high spatial resolution, non-interlaced scanning, and high refresh rate, results in a higher horizontal frequency (line rate) than is used in television.

For many applications the incompatibility between TV and PC is no problem, but as powerful computers and better graphics standards have become commonplace, advances in hardware and software have made it possible to produce sophisticated presentations and animations. We have appreciated that it would be highly desirable if the PC graphics output could simply be treated as a source of video. It could then be displayed on a TV-standard monitor or by a video projector, recorded on videotape, or even used in broadcasting.

Although the normal graphics mode of a typical personal computer is incompatible with the baseband video standards, many existing graphics cards (circuit boards) can in principle be run in a TV mode (often NTSC only). This involves setting an appropriate resolution, say 640×480 active pixels in the 525 line frame, and operating 2:1 field interlace at the standard line rate of 15.734 kHz.

In practice, this TV mode is often difficult to access, requiring low-level programming or installation of optional components on the graphics card, and may not be supported by the applications software. Other practical difficulties are that the PC's own monitor is often a "Fixed Frequency" type and will not display output at TV rates, and the interlacing causes severe flicker if there is fine detail present in the image. Even if these problems can be circumvented, the RGB output of such boards has to be externally encoded into composite video to be usable with most video equipment. It is however a low cost solution if it is feasible.

Alternatively, a separate external unit can be used to change the PC's normal graphics mode output to a TV rate by converting the line rate and, in most cases, the frame rate. This requires the analogue RGB from the graphics card to be re-sampled and buffered in a frame store. Most graphics modes do not have a simple relation to NTSC, so the number of lines in the frame may have to be altered by vertical scaling. After rate conversion and scaling, encoding into baseband video is straightforward, and is usually included in the same unit. An example of a scan converter using a frame store is described in U.S. Pat. No. 4,924,315 to Yamashita.

The extra flexibility of this scan conversion approach provides compatibility with a wider range of graphics cards and operating modes, and confers a large degree of transparency to the application and the user. Vertical filtering can be provided to reduce the flicker effect. It is possible to continue to use the PC's monitor while video is being produced by the scan converter, because the input to the scan converter is at normal graphics rates. The disadvantage is the complexity, because it needs to store a complete video frame, and consequently the cost of the scan converter itself.

It should also be noted that non-interlaced to interlaced signal converters are of themselves known, as for example described in U.S. Pat. No. 4,200,887 to Van Den Avoort and U.S. Pat. No. 4,386,367 to Peterson et al.

SUMMARY OF THE INVENTION

A preferred embodiment of the invention described in more detail below takes the form of a converter which receives a VGA 640×480 mode non-interlaced graphics signal. The converter converts this signal by halving the line rate to produce an interlaced signal, which can be treated as a video signal. The conversion is undertaken after analogue-to-digital conversion, and the output is reconverted to analogue. The conversion is undertaken by sampling at 8fsc and reducing the sample rate to 4fsc in a rate buffer. A degree of vertical averaging is applied in order to reduce flicker effects.

The present inventor has recognized that by making use of the 640×480 non-interlaced graphics signal it is possible to produce an acceptable video signal with much reduced instrumentational complexity. That is to say, the circuit uses a small number of line delays but has no need for a full picture store, or framestore.

BRIEF DESCRIPTION OF THE DRAWINGS

The invention will now be described in more detail, by way of example, with reference to the drawings, in which:

FIG. 6 is a timing diagram illustrating the operation of the circuit of FIG. 5.

DETAILED DESCRIPTION OF THE PREFERRED EMBODIMENTS

Figure 1:
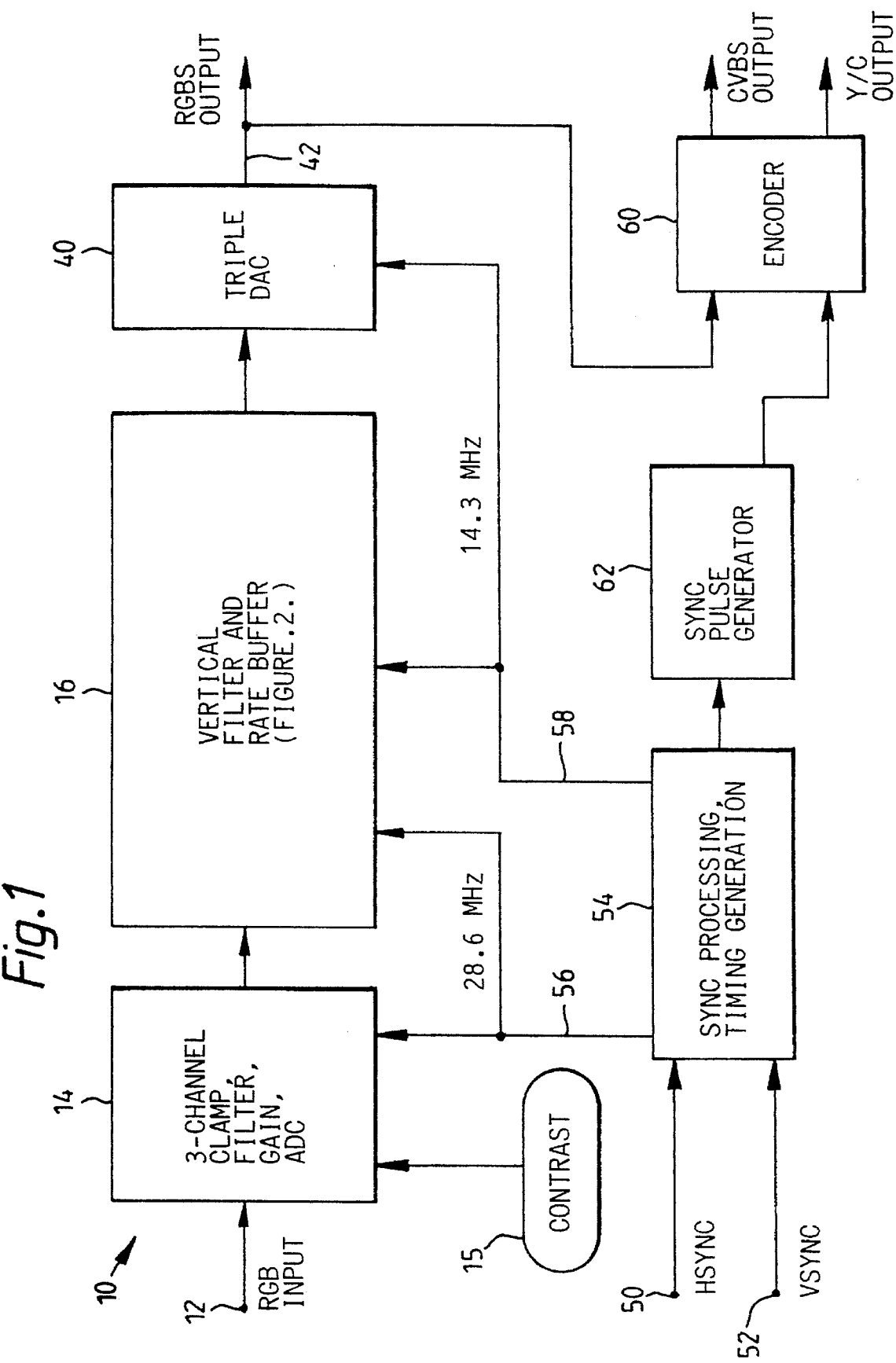
FIG. 1 is a block circuit diagram of a converter circuit for converting a PC graphics output into video format in accordance with the invention.

FIG. 1 is a block circuit diagram of a converter circuit 10 for converting a PC graphics output signal to a video signal at video standards. The circuit 10 is connected to the video output of a personal computer having a microprocessor and receives the RGB signals normally sent straight to the monitor. The circuit has a "loopthrough" output (not shown)

to which the monitor is connected instead, and passes the RGB signals through to the monitor so that the monitor can display a graphics image in the normal way as though the converter circuit was not there. The RGB inputs 12 of the circuit are also connected to three channels of black-level clamping, anti-alias filtering, gain adjustment, and analogue to digital conversion (ADC), all represented by block 14 on the figure. These are standard circuits and detailed description is not therefore necessary. A contrast control 15 may be provided. It should be noted that as the chosen sample rate is determined by the bandwidth requirements of the video output, the high bandwidth RGB input contains significant energy above the Nyquist frequency, so comparatively sharp cutoff filters are needed to prevent aliasing. The consequent reduction in image sharpness is an inevitable result of limiting a graphics image to TV bandwidths.

The ADCs in block 14 digitise each channel simultaneously to a resolution of, for example, 5/6, or 8 bits per component, according to the chosen cost/performance tradeoffs of a particular design. 16-bit color resolution is deemed satisfactory for many applications, and is often formatted as 5-6-5 (5 bits of Red and Blue with 6 bits of Green). This is because the eye is most sensitive to green and benefits from finer quantisation of this component. Other well known techniques, such as dither, can also improve the subjective quality of limited resolution color. 24-bit (8-8-8) comfortably exceeds the resolution of the eye and is satisfactory for the most demanding applications.

The digital outputs of the processing block 14 are then applied to three channels of vertical filtering and rate buffering 16. The vertical filter and rate buffer may take the form shown in FIG. 2. As will be seen the filter 16 illustrated in FIG. 2 comprises a transversal filter 18 with n one-line delays 20 arranged in series or cascade to provide n+1 taps. A coefficient multiplier 22 is included in each tap and the multiplier outputs summed in a combining unit or adder 24. The transversal filter acts as a vertical filter and the coefficients C(0) . . . C(n) are designed in known manner to reduce interlace flicker. The transversal filter operates at the sample rate set by the ADCs in the circuit 14.

The output of the vertical filter 18 is then applied to a rate buffer 26 comprising a further one-line store. A rate buffer is a first-in first-out (FIFO) store with separate write and read address counters and which can write and read simultaneously at different rates. Data from the output of the filter is clocked into the rate buffer at the data rate of the filter, ie at the sample rate used at the ADCs in circuit 14. Data is clocked out of the rate buffer at the data rate determined by the output device for the correct operation of eg a digital to analogue converter (DAC). Only those lines required for the output in the TV interlace format are clocked through the rate buffer.

Figure 2:
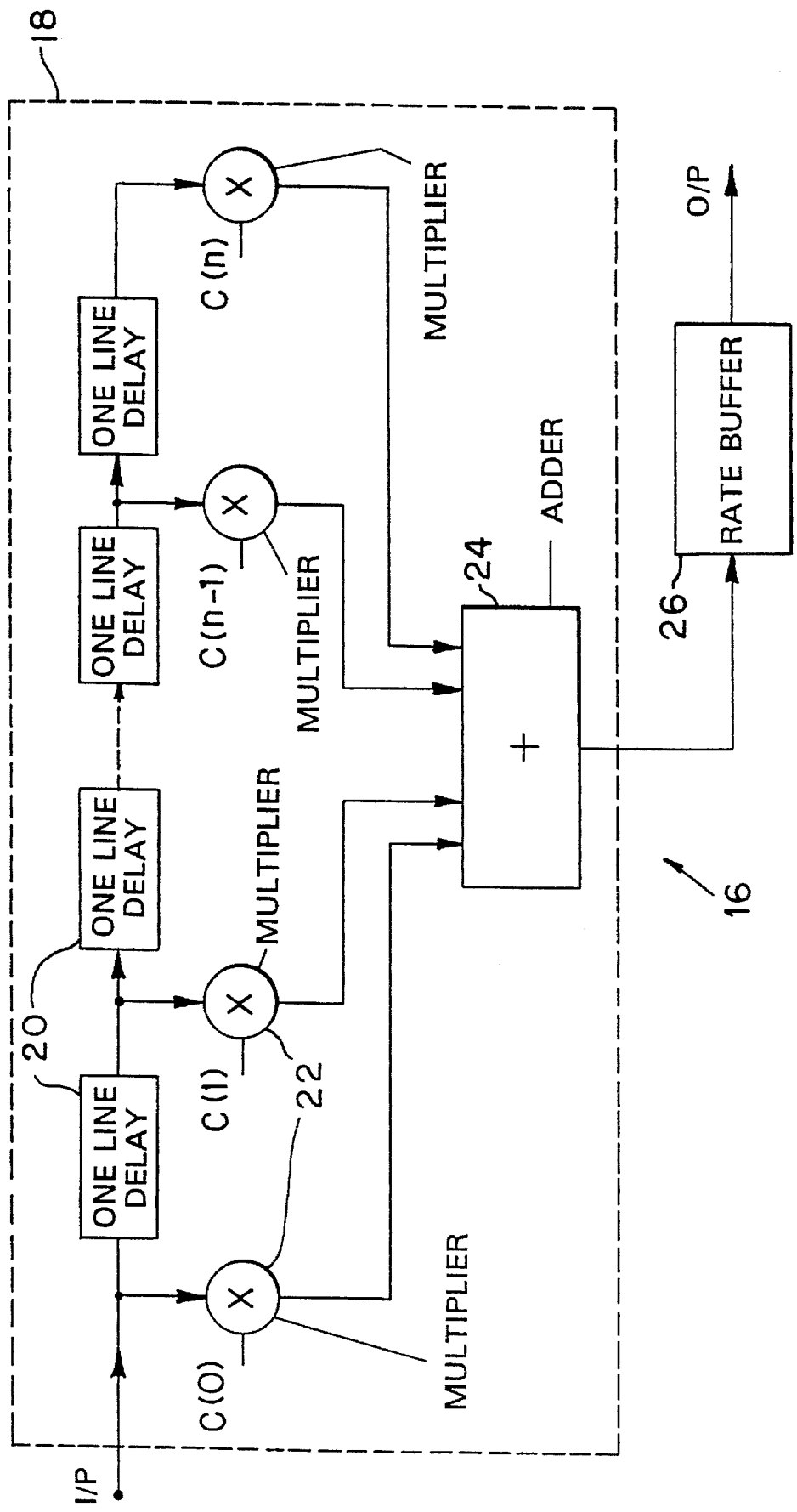
FIG. 2 is a block diagram of one form of the vertical filter and rate buffer circuit of FIG. 1.
Figure 3:
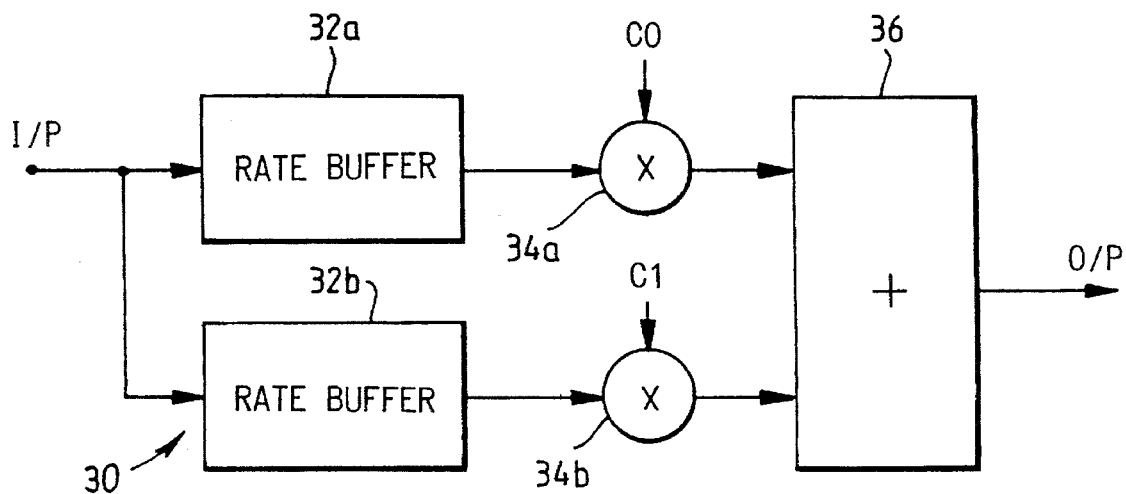
FIG. 3 is a block diagram of a simpler form of vertical filter and rate buffer.

FIG. 3 illustrates an alternative circuit 30 to replace the circuit 16 of FIG. 2. The circuit of FIG. 3 includes two rate buffers 32a, 32b, both connected to the input of the circuit 30, two coefficient multipliers 34a, 34b connected to the outputs of the rate buffers respectively, and an adder 36 to combine the outputs of the multipliers. This is a simpler circuit based on that of FIG. 2 but with n=2 and with the rate buffers at the input rather than the output of the transversal filter; this means that the filter has to move at only half the data rate.

By updating the line stores forming the rate buffers 32a, 32b in rotation, the pair of line stores always hold the current line (m) and the previous line (m−1). When the output field is even, the odd lines in the input frame are current; when the output field is odd, the even lines are current. It is then possible to average the two adjacent lines in the non-interlaced frame and output a single resultant line (M). In the next frame, m is averaged with m+1 to produce M+1 after interlacing; spatially adjacent lines M and M+1 in the odd and even fields contain equal contributions from any single pixel feature in line m. At normal viewing distance, the effect is a large reduction in flicker. FIG. 2 operates similarly but with a more sophisticated vertical aperture function. FIG. 3 has the advantage of using the same line stores for the transversal filter and rate buffering operations.

Reverting to FIG. 1, the output of the circuit 16 is applied to three digital-to-analogue converters (DACs) 40. It will be appreciated from the foregoing that the whole of the circuits 14, 16, 40 provide three channels for the red, green and blue component signals respectively. Thus the outputs 42 of the DACs 40 comprises an RGB video output additional to the loopthrough graphics output to the monitor.

The system is designed to receive at input 12 a PC graphics output signal in a so-called VGA 640×480 non-interlaced mode. The VGA graphics display standard is extremely well known and detailed description thereof is not necessary. However, the VGA 640×480 modes have the following nominal characteristics:

(i) a frame rate of 59.95 Hz (ii) a line rate of 31,469 kHz (iii) a non-interlaced (progressive or sequential) line/frame structure (iv) 525 lines per frame (v) approximately the same number of active lines per frame as NTSC (i.e. 486).

The inventor has appreciated that by using a VGA 640×480 non-interlaced graphics mode as the PC output it is possible to generate a video output signal without the need for and hence expense of a full frame store. Rather, the operation can be undertaken by the simple filtering and buffering illustrated in FIGS. 1 to 3. This is because the VGA frame rate is exactly equal to the NTSC frame rate, and the VGA line rate is exactly twice the NTSC line rate.

Thus by converting the VGA signal from a non-interlaced or sequential signal having the same number of lines per picture, i.e. half the number of lines per field, the resultant signal can be handled as an NTSC video signal.

The VGA 640×480 non-interlaced modes are thus converted to interlaced form in the circuit of FIG. 1 by rate buffering of alternate lines. This can be conveniently be done by sampling the RGB input at, for example, 8 fsc (i.e. eight times the NTSC color sub-carrier frequency) and writing the samples into a FIFO line store. There will be 910 samples (pixels) per line.

The samples can then be read out at 4 fsc, thus precisely halving the line rate, and the output sample rate is ideally suited to encoding into NTSC. Interlace can be achieved by choosing all the odd lines from one frame and all the even lines from the next frame.

Interlace can be a problem with computer graphics after they have been converted to another line standard, because a feature which is only a single pixel high, such as a thin horizontal line, is only present on one of each pair of fields and thus flickers at 30 Hz. The circuits of FIGS. 2 and 3 provide the necessary vertical filtering to overcome this problem as described above.

FIG. 1 includes the following additional elements. Inputs 50 and 52 receive respectively the horizontal and vertical synchronising pulses associated with the R, G, B components at input 12. A sync. processing and timing generation circuit 54 provides clock pulses for operating the other parts of the circuit. In particular it supplies on a line 56 pulses at 28.6 MHz, i.e. eight times the color subcarrier frequency fsc, to circuits 14 and 16, and supplies on a line 58 pulses at 14.3 MHz, four times fsc to the circuits 16 and 40. These serve as clock pulses for the digital line delays in the filter and rate buffer 16, and for the ADCs in block 14 and DACs 40.

It will be seen therefore that the inputs to the system, which are derived from the output of a VGA board in a PC, consist of the PC monitor drive signals conforming to the VGA standard in a 640×480 non-interlaced mode together with the horizontal and vertical synchronising pulses. The monitor drive signals consist of the analogue red, green and blue component signals and are also looped through to the computer monitor. Alternatively they may be applied in parallel to the computer monitor.

The outputs of the system can be in RGB form or can be in encoded form, with the addition of appropriate conventional encoding circuitry. In particular, outputs in one or more formats of baseband NTSC video, conforming to RS170A timing may be provided. Different formats are preferably made available for interfacing with different types of equipment. One format may be "composite", also known as CVBS or "one-wire". A related format is Y/C, also known as S-video or "two-wire", in which the luminance and composite chrominance are output separately. The RGB output may be provided in several minor variants: three-wire, four-wire or five-wire, and may be used as a video signal for display, processing or recording.

To provide an encoded output an appropriate encoder 60 is included which receives the outputs 42 from the DACs. The encoder includes a conversion matrix for converting from R,G,B to Y, B-Y, R-Y; band limiting filters for B-Y and R-Y; a chrominance modulator, a compensating delay line for the luminance Y, and a sync. inserter. The encoder receives the analogue RGB from the DACs 40, and also receives composite synchronising pulses from a sync. pulse generator 62, connected to the timing generation circuit 54.

The timing generation circuit 54 contains a phase-locked loop which generates the 8 fsc and 4 fsc sample rates and locks them to the PC's horizontal sync. signal using a divisor of 910. The circuit also originates odd/even line identifiers and odd/even field identifiers, and various other timing control signals for the line stores and sync. pulse generator, as required by the particular circuit implementation.

Figure 4:
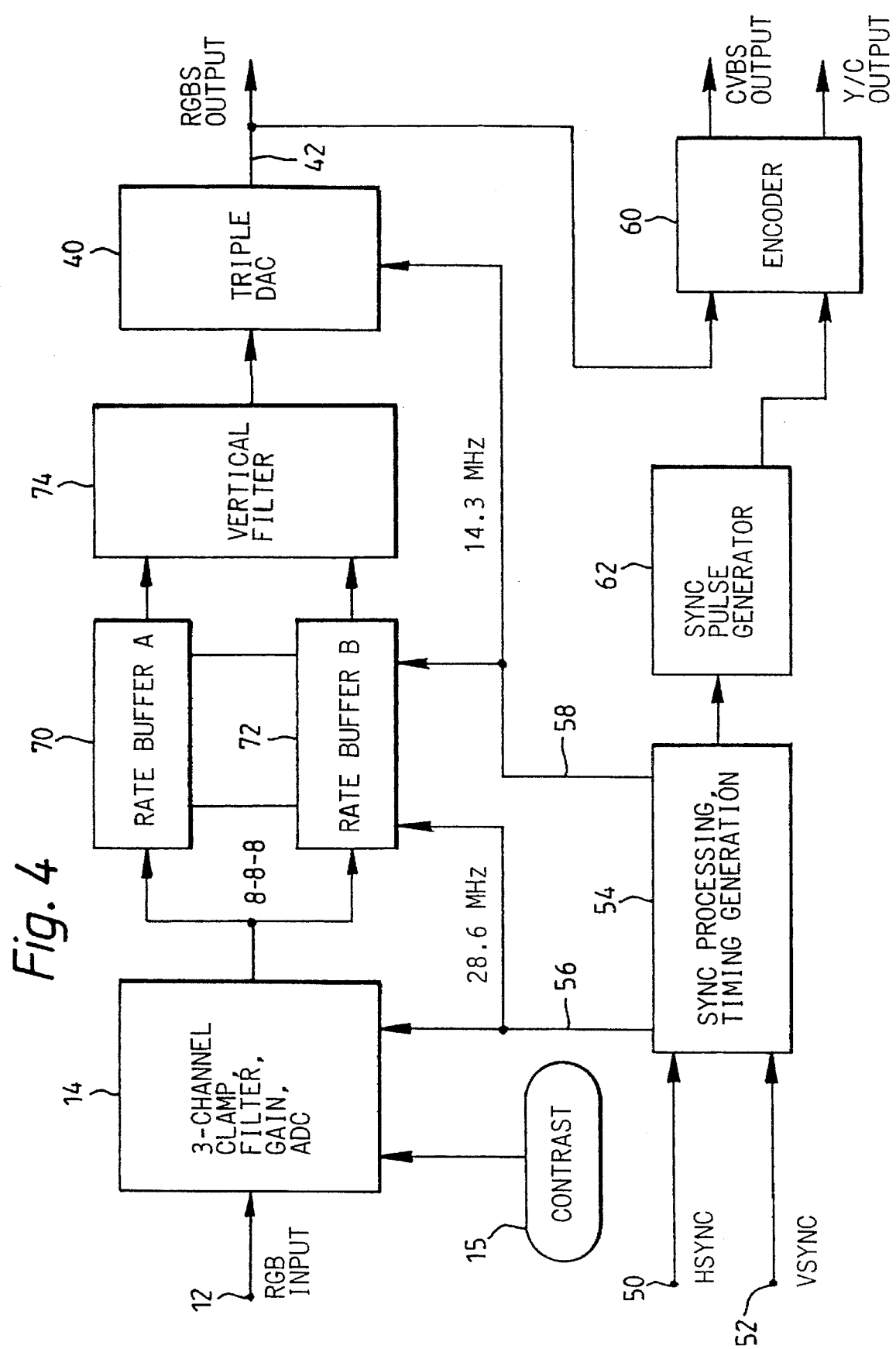
FIG. 4 is a block diagram similar to FIG. 1 of a second converter circuit embodying the invention in which the vertical filter and rate buffer circuit of FIG. 1 is replaced by the alternative circuitry of FIG. 3.

FIG. 4 illustrates a second embodiment of the invention which is similar to that shown in FIG. 1, except that the block 16 is replaced by a pair of rate buffers 70,72 connected to the output of block 14, together with a separate vertical filter 74 receiving the two outputs of the rate buffers. Like FIG. 3, the rate buffers are now in front of the vertical anti-flicker filter. The rate buffers are again line stores which have internal address generation and two separately clocked data ports, one to write data at the input sample rate and the other to read data at the back end sample rate. They behave like synchronous FIFOs. The line stores A and B are written with incoming lines in the order A, B, A, B . . . Both A and B are read out simultaneously at half of the write sample rate. Each vertical pair of pixels in the two-line output of the line stores is averaged for each color component.

Figure 5:
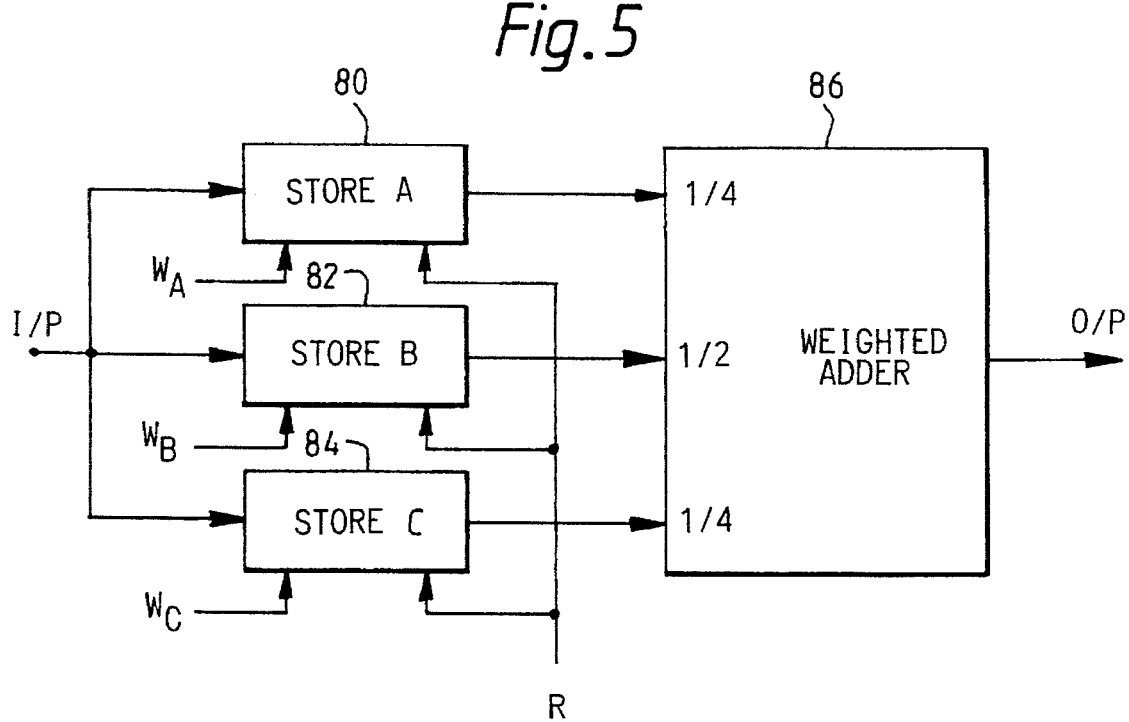
FIG. 5 is a block diagram of a further vertical filter and rate buffer for use in the circuit of FIG. 1.

In the further embodiment illustrated in FIG. 5, the block 16 is replaced by three rate buffers 80,82,84 connected to the output of block 14, together with a separate vertical filter circuit 86 receiving the outputs of the three rate buffers. The rate buffers are of similar construction to those of FIG. 4. The vertical filter provides a weighted addition in the proportions 1:2:1 thus providing a weighted average of three input lines that are adjacent in the non-interlaced input signal to form each interlaced output line. This filter function gives improved flicker reduction compared with the simple line averaging of FIGS. 3 and 4.

The operation of the circuit of FIG. 5 is illustrated in FIG. 6. The three rate buffers 80, 82, 84 are termed store A, store B and store C. The numbers 1,2,3 . . . designate successive lines of the input non-interlaced video signal. Row (i) in FIG. 6 shows the lines 1,2,3 . . . received by the circuit, and row (ii) shows how these are distributed to the three stores A,B,C. This distribution is achieved by enabling the write line to the appropriate store. It will be seen that the lines are not distributed amongst the stores in a normal cyclical sequence, but rather are applied to the three stores in the following order:

A, B, C, B, A, B, C . . .

As will be seen this leads to the lines being held in the three stores as shown at rows (iii), (iv) and (v) in the figure. The even lines of the field shown are always applied to store B, and the odd lines are distributed alternately to stores A and C. When a new line is written into a store the old line is replaced over the duration of one input line period.

Row (vi) shows how the interlaced output lines are obtained. Each output line is the average of three input lines. The output lines are numbered by reference to the centre one of the three lines. Thus output line 2 is formed of a weighted average of lines 1, 2 and 3. The output lines are read out at half the input line rate. Output line 2 can not start being read until input line 3 is being received. Thus output line 2 will be read over the duration of the two input lines 3 and 4.

During the first half of output line 2, it is clear that an average of lines 1, 2 and 3 can be formed by reading the stores A, B and C. Because the writing takes place faster than the reading, once the line has begun, line 3 will already be available in store C.

During the second half of line 2, it is seen that line 4 is written over line 2 in store B. However, the second half of line 2 remains in the store for long enough to be read to contribute to the output line.

The system then continues, as clearly shown in FIG. 6. Output line 4 is formed from input lines 3, 4 and 5, output line 6 from input lines 5, 6 and 7, and so on. Because the reading rate is half the writing rate, during the first half of each line the current input line which is overwriting a previous line is read, and during the second half of each line, the line which is being overwritten is read and not the then-current input line.

The slight theoretical contention at the very beginning and very end of each line can be dealt with by very slight re-timing as will be apparent to those skilled in the art. The storage system is however particularly neat in the way it operates to provide the required output signal with minimal signal storage. It will be noted that the centre line of the three lines being averaged is always made available to the centre one of the three inputs of the filter circuit 86.

At the end of the field, because of the fact that there are an odd number of lines per field, the system automatically changes to outputting the odd-numbered lines rather than the even-numbered lines, thus providing the desired interlaced signal.

The writing and reading is controlled by means of signals $W_A$, $W_B$, $W_C$ and R as shown in FIG. 5 which are generated by the control circuit 54 of FIG. 1 in a manner which will be clear to those skilled in the art. As is seen the writing takes place in the sequence A,B,C,B,A and not in a normal cyclical sequence A,B,C,A,B,C, and the reading rate is half the writing rate.

The examples illustrated above demonstrate that the invention can provide a method of converting the graphics output of a personal computer into video format in an extremely cost-effective manner, without the need for a full frame store, but using only a few lines of storage. Nevertheless the inherent problem of reducing interlace flicker can be effectively overcome.

It will be appreciated however that many modifications and changes can be made to the circuits illustrated within the scope and spirit of the following claims.

I claim:

1. A converter for converting a computer graphics signal into a video signal, comprising:

receiving means for receiving an input computer graphics signal in the form of a VGA 640×480 mode non-interlaced signal; and converting means coupled to said receiving means for converting said non-interlaced signal to an interlaced signal with half the number of lines per field; said converting means comprising:

three line stores A, B, C coupled to receive lines of said non-interlaced signal at a first line rate and to output an output signal at a second line rate which is half said first line rate, each said line store being a first-in first-out (FIFO) store;

means coupled to the outputs of said three line stores for providing a weighted average of said output signals from said line stores; and means for causing input lines to be applied to said line stores in the sequence A, B, C, B, A . . . .

2. A converter according to claim 1, in which said computer graphics signal is an analogue signal, and including an analogue-to-digital converter for converting said input computer graphics signal into a digital signal, and in which said converting means operates on said digital signal.

3. A converter according to claim 2, in which said digital signal has a sample rate which is substantially equal to eight times the color subcarrier frequency of a composite video signal and the output signal has a second sample rate which is substantially equal to four times said color subcarrier frequency.

4. A converter according to claim 1 including an encoder coupled to the output of said converting means for encoding the output thereof into one of CVBS and Y/C formats.

5. A converter according to claim 1, in which said line stores each include a data input, a data output, a write clock input and a read clock input, and in which each said line store is capable of receiving data at said data input in response to write clock pulses received at said write clock input and, simultaneously, outputting data at said data output in response to read clock pulses received at said read clock input.

6. In a personal computer system comprising a personal computer having a microprocessor and a video output, said video output being capable of providing a non-interlaced graphics signal in VGA 640×480 mode, and a video monitor for displaying a graphics image in response to said graphics signal, a converter circuit, said converter circuit comprising:

input means for connection to said video output of said personal computer;

first output means coupled to said input means for connection to said video monitor;

converting means coupled to said input means for converting said non-interlaced graphics signal to an interlaced signal with half the number of lines per field and each line having double the line duration, said converting means comprising three line stores coupled to receive lines of said non-interlaced signal at a first line rate and to output an output signal at a second line rate which is half said first line rate, each said line store being a first-in first-out (FIFO) store, and means for causing successive input lines to be stored in said line stores in the sequence A, B, C, B, A . . . .

7. The invention according to claim 6, in which said line stores are connected to receive lines of said non-interlaced signal in digital form at a first sample rate and to output an output signal at a second sample rate which is half said first sample rate.

8. The invention according to claim 7, wherein said first sample rate is substantially equal to eight times the color subcarrier frequency of a composite video signal and the second sample rate is substantially equal to four times said color subcarrier frequency.

9. The invention as claimed in claim 6, in which said converting means comprises weighted averaging means coupled to receive the outputs of said three line stores.

10. The invention as claimed in claim 9, in which said weighted averaging means averages the lines in the proportions 1:2:1.

11. A non-interlaced to interlaced video signal converter comprising:

an input for receiving a digital video input signal at a first line rate;

three one-line stores each coupled to said input to receive lines of said digital video signal;

averaging means coupled to the outputs of said three one-line stores to generate a weighted average therefrom; and control means for controlling the writing of lines of said digital video input signal into said stores and the reading from said stores to said averaging means, said control means causing said lines of said digital video input signal to be applied to said stores at a first rate and in the sequence A,B,C,B,A . . . , and causing lines to be read from said stores simultaneously at a second rate which is substantially half said first rate.

12. A converter for converting a computer graphics signal into a video signal, comprising:

receiving means for receiving an input computer graphics signal in the form of a VGA 640×480 mode non-interlaced signal; and converting means coupled to said receiving means for converting said non-interlaced signal to an interlaced signal with half the number of lines per field; said converting means comprising:

a plurality of line stores coupled to receive lines of said non-interlaced signal at a first line rate and to output an output signal at a second line rate which is half said first line rate, each said line store being a first-in first-out (FIFO) store and having a data input, a data output, a write clock input and a read clock input, and each said line store being capable of receiving data at said data input in response to write clock pulses received at said write clock input, and simultaneously, outputting data at said data output in response to read clock pulses received at said read clock input; and means coupled to said data outputs of said line stores for providing an output video signal formed of an average of said output signals from said line stores so as to apply a filter function to said output signals from said line stores to generate said output video signal.

13. A process for converting a computer graphics signal into a video signal, comprising the steps of:

receiving an input computer graphics signal in the form of a VGA 640×480 mode non-interlaced signal; and converting said non-interlaced signal to an interlaced signal with half the number of lines per field, said converting step comprising:

providing a plurality of line stores, each said line store being a first-in first-out (FIFO) store having a data input, a data output, a write clock input, and a read clock input;

applying input lines of said input computer graphics signal sequentially to said line stores at a first line rate;

applying write clock pulses to an individual line store to enter input line data into said line store and, simultaneously, applying read clock pulses to said individual line store to output data from said data output of said individual line store; and forming an average of said output signals from said line stores so that a filter function is applied to said output signals from said line stores to generate an output video signal having a second line rate, said second line rate being half said first line rate.

* * * * *